United States Patent [19]

Milligan et al.

[11] Patent Number: 4,980,833

[45] Date of Patent: Dec. 25, 1990

[54] AIRPLANE TAKE-OFF MONITOR WITH LEARNING FEATURE

[75] Inventors: Mancil W. Milligan; H. Joe Wilkerson, both of Knoxville, Tenn.

[73] Assignee: The University of Tennessee Research Corporation, Knoxville, Tenn.

[21] Appl. No.: 224,492

[22] Filed: Jul. 26, 1988

[51] Int. Cl.⁵ .................... G06F 15/50; G06F 15/18
[52] U.S. Cl. ............................ 364/427; 73/178 T; 244/183
[58] Field of Search ............... 364/427, 428, 424.06, 364/433; 73/178 T; 340/972; 244/183

[56] References Cited

U.S. PATENT DOCUMENTS

| | | | |
|---|---|---|---|
| 2,947,502 | 10/1960 | Gold | 73/178 |
| 3,025,494 | 3/1962 | Andresen, Jr. | 340/27 |
| 3,077,110 | 2/1963 | Gold | 73/178 |
| 3,086,394 | 4/1963 | Peck | 73/178 |
| 3,116,638 | 1/1964 | Brahm | 73/178 |
| 3,120,658 | 2/1964 | Lukesh et al. | 343/7 |
| 3,128,445 | 4/1964 | Hosford | 340/27 |
| 3,148,540 | 9/1964 | Gold | 73/178 |
| 3,174,710 | 3/1965 | Hoekstra | 244/76 |
| 3,192,503 | 6/1965 | Lang | 340/27 |
| 3,200,642 | 8/1965 | Neuendorf et al. | 73/178 |
| 3,435,674 | 4/1969 | Sleight et al. | 73/178 |
| 3,504,335 | 3/1970 | Hall et al. | 340/27 |
| 3,709,033 | 1/1973 | Pollitt | 73/178 |
| 3,738,165 | 6/1973 | Hansen | 73/178 |
| 3,863,204 | 1/1975 | Hoekstra | 340/27 |
| 3,865,071 | 2/1975 | Manor | 116/129 |
| 3,897,683 | 8/1975 | Hansen | 73/178 |
| 4,042,197 | 8/1977 | Boyle et al. | 364/427 |
| 4,122,522 | 10/1978 | Smith | 364/427 |
| 4,212,064 | 7/1980 | Forsythe et al. | 73/178 T |
| 4,251,868 | 2/1981 | Aron et al. | 364/427 |
| 4,454,582 | 6/1984 | Cleary et al. | 364/427 |
| 4,490,802 | 12/1984 | Miller | 364/567 |
| 4,507,657 | 3/1985 | Bates | 340/959 |
| 4,638,437 | 1/1987 | Cleary | 364/427 |
| 4,773,015 | 9/1988 | Leland et al. | 364/427 |

OTHER PUBLICATIONS

Fusca, "Takeoff Monitor Computes Runway Roll," 10/13/58, Aviation Week, pp. 99–105.
Business and Commercial Aviation Magazine; Author-R. C. Scott; Title Big Versus Small, Jul. 1985-p. 16.
Business and Commercial Aviation Magazine; Author Unknown; Title-Aviation Intelligence/3, Nov. 1985-p. 24.
Business and Commercial Aviation Magazine; Author Unknown; Title-The Engine-Failure Decision, Dec. 1985; pp. 106, 109 and 110.

*Primary Examiner*—Thomas G. Black
*Attorney, Agent, or Firm*—Luedeka, Hodges & Neely

[57] ABSTRACT

A take-off performance monitor uses a sensor to produce a movement signal proportional to the movement of an aircraft during a take-off roll and, for each take-off, historical data is generated and stored based on the movement signal. An analyzing unit of the monitor uses the historical data and current conditions to calculate a reference take-off distance, reference acceleration data and reference velocity data. This information is output to the pilor to facilitate his judgment as to the adequacy to take-off performance. In the preferred embodiment, the analyzing unit utilizes five samples of acceleration and velocity during a take-off roll to solve an equation for five constants that are indicative of take-off performance. The five constants relate to static thrust, a linear relationship between thrust and velocity, a non-linear relationship between thrust and velocity, air drag and rolling drag, and these five constants constitute at least part of the historical data. During an actual take-off the actual acceleration of the aircraft and the reference acceleration are displayed to allow the pilot to make a quantitative evaluation of the takeoff performance. This comparison can be made at velocities much below take-off velocity and thus will allow a safe abortion of abnormal take-offs. In addition to an acceleration comparison a live take-off distance, based on actual take-off acceleration, is displayed and compared to the reference take-off distance as predicted in part from historical data.

15 Claims, 4 Drawing Sheets

| | ACC. at 60 kts | ACC. at 40 kts |
|---|---|---|
| JAN. | 10.2 fps$^2$ | 9.3 |
| FEB. | 10.1 | 9.2 |
| MAR. | 10.2 | 9.2 |
| APR. | 10.0 | 9.0 |
| MAY | 9.7 | 8.7 |

Fig. 7

AIRPLANE TAKE-OFF MONITOR WITH LEARNING FEATURE

FIELD OF THE INVENTION

The present invention relates to aircraft take-off performance monitors and particularly relates to a monitor that learns aircraft take-off performance characteristics.

BACKGROUND OF THE INVENTION

It is critically important to monitor aircraft performance during take-off so that a pilot will know as soon as possible if he/she can not take off safely. The pilot needs to detect inadequate take-off performance at low speeds during the early part of the take-off roll. If he waits too long, the pilot may not be able to take-off in the remaining runway, nor can he stop in the remaining distance. At that point, such information is not very useful. Even though the pilot understands the need for early take-off performance evaluation, it is very difficult for the pilot to detect inadequate performance at low speeds during the early ground roll.

Numerous devices have been proposed to help a pilot monitor take-off performance but, to date, these devices have not proved themselves to be very useful. One problem with many such devices is that they assume that the aircraft is capable of a certain performance which is sometimes referred to as "handbook" performance. That is, these devices assume that the aircraft will have a certain amount of thrust, lift, air drag and rolling drag. In reality, all of these factors will vary from plane to plane. No known device operates to learn the performance characteristics of the airplane in which it is mounted.

In addition to the different flight characteristics of every plane, each pilot will fly the plane slightly differently from other pilots. For example, engine settings for take-off will vary from pilot to pilot. To make a meaningful and early prediction of inadequate take-off performance, a monitor must take all of these variables into consideration. Known monitors do not have the ability to acquire and utilize these parameters.

A pilot, of course, does have the ability to learn the unique operating characteristics of each plane and pilot, but the number of factors influencing take-off performance make it very difficult to detect inadequate performance at low speeds during the early part of the take-off roll. The acceleration of an aircraft during take-off is affected by numerous factors including weight of the aircraft, air temperature, air pressure, power settings, rolling resistance and others. These numerous factors make the pilot's job of judging take-off performance very complex. The ability of a pilot to judge take-off performance is further hampered by the fact that he flies different planes that have different characteristics. Thus, the job of judging take-off performance at low speeds remains difficult and uncertain.

SUMMARY OF THE INVENTION

The present invention provides a "smart" monitor that learns the unique take-off characteristics of an aircraft over a period of time and keeps historical data indicating the take-off performance history. In accordance with the invention, the monitor uses the plane's historical data to predict take-off performance and, by comparing the predicted to the actual performance, quickly detects substandard performance so that the pilot can be warned. As used herein, the terms reference take-off distance, reference acceleration and reference velocity refer to predicted values based upon historical data and other input data on current conditions (ie, atmospheric pressure, wind direction and speed, etc.) The terms actual acceleration and actual velocity refer to measured values, and the term live take-off distance refers to a distance that is calculated during an actual take-off and is based in part upon actual acceleration.

In accordance with the present invention, the take-off performance monitor includes an instrument, preferably an accelerometer, for measuring the movement of the aircraft during a take-off roll to produce a movement signal. A storage device records data corresponding to the movement signal and, in preferred embodiment, this historical data includes data based on the acceleration and velocity of the airplane in each take-off. This historical data is accumulated for all or selected take-offs. An analyzing unit in the monitor analyzes the performance of the aircraft during at least a portion of the take-off based upon the movement signal and, based upon the movement signal and the historical data, take-off performance information is output to the pilot so that he can judge the adequacy of the aircraft performance during take-off.

In the preferred embodiment, the monitor is provided with a calculating means that calculates at least one take-off constant based on input parameters affecting take-off performance and based upon the movement signal. In this embodiment, the constants are measures of take-off performance and are stored as the historical data. The analyzing unit analyzes this historical data from previous take-offs and analyzes the current take-off performance to produce the analyzed data. In one form of the present invention, the analyzing means uses input parameters concerning weather, engine settings and the like and the historical data to produce a reference take-off performance. This reference take-off performance is output as part of the analyzed data. In one form of the invention, for example, the analyzing circuit calculates reference accelerations for velocities encountered during the take-off roll and a reference take-off distance, both of which are based upon the input parameters and historical data. Also, the actual acceleration is measured and the live take-off distance is calculated based at least upon the movement signal and the input parameters. Then, this information is output to the pilot. Preferably, the pilot is shown his actual acceleration as compared to his predicted acceleration for his current velocity and live take-off distance as compared to his reference take-off distance. In addition to actually displaying the data for the pilot, various warning signals are used to alert the pilot to the fact that his actual take-off performance is below the predicted performance.

Although numerous schemes could be developed in accordance with the present invention to record historical data and predict take-off performance based thereon, in the preferred form, the monitor of the present invention takes five samples at different velocities during a take-off roll. Each sample includes a measure of actual acceleration and a measure of actual velocity that is preferably determined by integrating actual acceleration. Using these five samples, an equation is solved to determine the values of five constants. The values of these five constants are indicative of take-off performance and are independent from the input parameters such as engine power settings and atmospheric conditions. Since the constants are independent of the input parameters, they enable the monitor t predict take-off performance under different conditions. That is, when the atmospheric conditions (pressure temperature and wind) change, the input parameters are changed accordingly and, then, using the five constants and the equation, the reference take-off performance of the aircraft can be predicted under the new set of parameters. It will be appreciated that these five constants are learned by the monitor, not given to the monitor. The constants are learned from actual take-offs. They may be learned from one take-off, but more reliably, they are learned from a number of take-offs and then averaged.

BRIEF DESCRIPTION OF THE DRAWINGS

The present invention may best be understood by reference to the following Detailed Description of a preferred embodiment when considered in conjunction with the accompanying Drawings in which.

DETAILED DESCRIPTION

Figure 1:
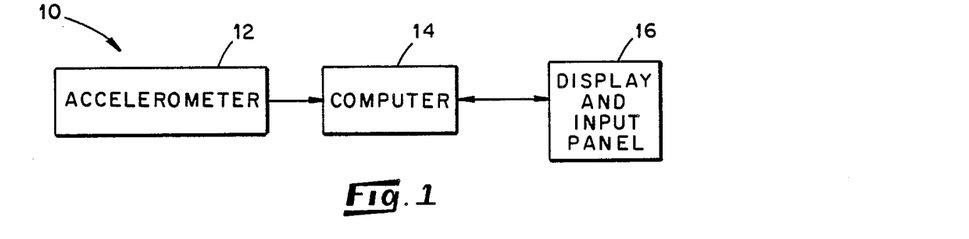
FIG. 1 is a simplified block diagram of the indicator 10 of the present invention.

Referring now to the Drawings in which like reference characters designate like or corresponding parts throughout the several views, there is shown in FIG. 1 a block diagram of an airplane take-off performance indicator 10 representing a preferred embodiment of the present invention. Indicator 10 includes an accelerometer 12, a computer 14 and a display and input panel 16. The accelerometer 12 provides a signal to the computer 14 indicating the actual acceleration of the airplane in which the indicator is mounted, and during the ground roll of the aircraft, the computer 14 integrates the acceleration signal to determine the actual velocity of the aircraft and integrates again to determine the actual distance traveled by the aircraft. The computer 14 then displays information on the panel 16 and stores information as historical data. The panel 16 also includes inputs so that a pilot may input information into the computer 14 as well as receive information from the computer.

The indicator 10 provides independent advisory performance data to the pilot of an airplane during the take-off ground roll. The device provides real-time take off performance monitoring in the low speed portion of the take-off and permits timely abort decisions by the pilot in case of subnormal performance. Using indicator 10, abort decisions are made under non-critical and non-hazardous low speed conditions significantly below the take-off rotation speed.

In particular, the take-off performance indicator 10 provides advisory performance data based on the take-off performance history of the airplane operating under actual flight conditions. It does not assume that the aircraft attains handbook performance level, and it does not assume that the pilot follows the same take-off procedure regardless of take-off conditions. Instead, the indicator 10 learns the historical take-off characteristics of the aircraft and judges a current take-off based on those historical take-off characteristics, the input data and the actual acceleration.

In the present invention, it is recognized that there are often significant differences between the actual take-off performance and the so called certified handbook performance. These differences are commonly the result of differences in pilot technique such as the use of rolling take-offs during which the flight crew is gradually adjusting thrust. Further it is common for pilots of airplanes with excess performance compared to the available runway to use conservative engine performance limits, that is, thrust values below maximum rated conditions. Also, thrust, air drag and rolling drag of every airplane will differ slightly even in the case of relatively new airplanes of the same model. By learning how the aircraft performs on actual take-offs, the indicator 10 is able to provide an accurate and meaningful indication of take-off performance and is better suited to detect a problem in performance during low speeds in the early part of the take-off roll.

Figure 2:
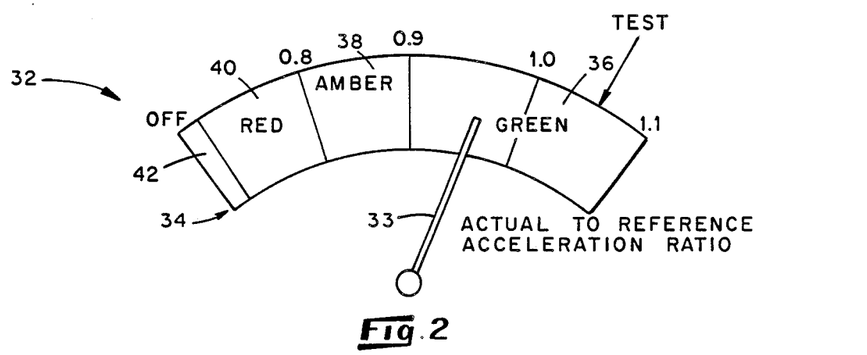
FIG. 2 is a diagrammatic view of an analogue meter for visually displaying a comparison of actual take-off acceleration as compared to reference take-off acceleration for the actual velocity of the aircraft.
Figure 3:
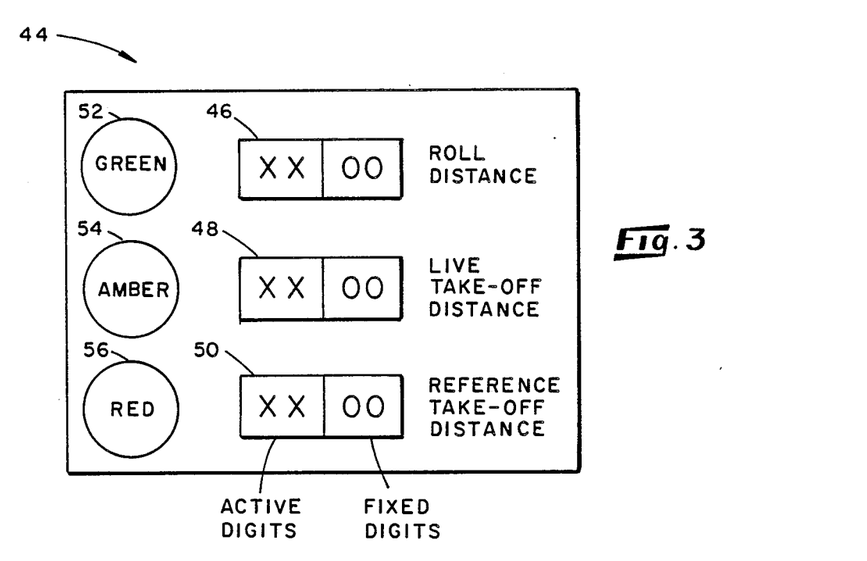
FIG. 3 is a diagrammatic view of a display of the take-off performance indicator that shows actual take-off roll distance, a live take-off distance for present take-off calculated in part from actual acceleration and a reference take-off distance calculated in part from historical data.
Figure 4:
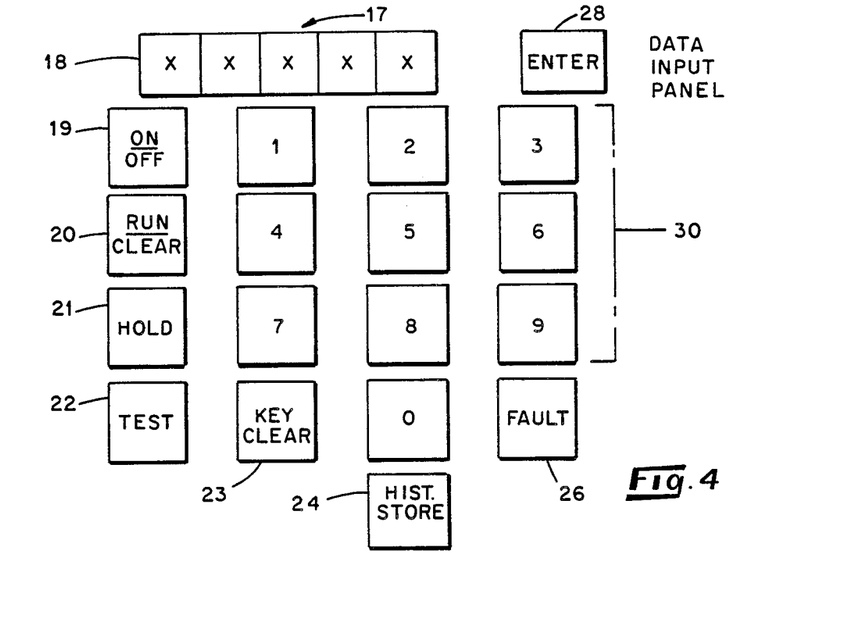
FIG. 4 is a diagrammatic view of an input register and display for inputting data into the take-off performance indicator.

Referring to FIGS. 2-4 in conjunction with FIG. 1, an overview of the function of indicator 10 will be given. FIG. 4 represents the data input register 17 of the display and input panel 16, and it includes an input display 18, function keys 19-22, clear key 23, historical store key 24, fault key 26, enter key 28 and numerical keys 30. To begin operation, the pilot will depress the on/off key 19 and then will depress the test key 22. The test key 22 will cause the indicator 10 to perform a self-test and provide a self-test indication in display 18. After the self-test is complete, the pilot will depress the hold key 21, and the display 18 will begin to request input information from the pilot concerning operating conditions including gross weight of the aircraft, slope of the runway, atmospheric conditions, engine settings, etc. The pilot will enter the information by depressing the numerical keys 30 and the enter key 28. If a mistake is made while entering, a key clear 23 is provided to erase that one particular entry. After all of the data has been entered, the test key 22 may be depressed again, and the display 18 will show each entry one at a time and inquire as to whether the information is correct. If it is, the enter key 28 is depressed, and the display will show the next entry. However, if the displayed entry is incorrect, the fault key 26 may be depressed, and the numerical keys 30 are then used to replace the faulty information.

After all of the information has been entered, the computer 14 will calculate a reference acceleration curve for this particular take-off based upon the input information and a historical data base within the computer 14. This reference acceleration curve will predict the acceleration of the aircraft at any particular velocity as it moves down the runway during take-off. The computer 14 will also calculate a reference take-off distance based upon this acceleration curve. That is, the computer 14 will calculate the distance required to achieve V₁, rotation velocity, based on the reference acceleration curve. When the aircraft is positioned at the end of the runway prepared to take-off, the run/clear key 20 is depressed which tells the computer 14 that the take-off roll is about to begin.

Referring to FIG. 2, there is shown an analogue meter that indicates to the pilot whether his aircraft is achieving the reference take-off acceleration. The meter 32 includes a needle 33 that will point to a dial 34 which is divided into a green section 36, an amber section 38, a red section 40 and an off section 42. When the take-off roll begins, the needle 33 will remain in the off position until the aircraft has achieved a selected minimum speed, typically, about 40 knots for most jets. During this initial part of the ground-roll, it is anticipated that the pilots may be adjusting the thrust and that it would not be appropriate to display any type of acceleration information on meter 32 during this time of adjustment. However, when the minimum velocity is achieved, the needle 33 will immediately point to the appropriate section on the dial 34. If the needle points to the green section 36, it is indicating that the actual acceleration of the aircraft for the actual velocity of the aircraft is within an acceptable range of the reference acceleration that is based upon historical data. Typically, this acceptable range would be between 90 percent and 110 percent of the reference acceleration. If the actual acceleration of the aircraft at a particular velocity is between 80 percent and 90 percent of the reference acceleration for that velocity, the needle 33 will point to the amber section 38 of the dial 34 and indicate to the pilot that he should exercise caution concerning the take-off performance of the aircraft. If the actual acceleration of the aircraft falls below 80 percent of the reference acceleration for any velocity, the needle 33 will point to the red section 40 of the dial 34 and the pilot should consider aborting the take-off The aforementioned percentages are meant to be examples and can be changed by the user to meet specific requirements.

In addition to the meter 32, the display and input panel 16 includes a digital roll distance display panel 46 shown in FIG. 3 in which the actual roll distance traveled by the airplane as it moves down the runway is shown in display 46. In the preferred embodiment, the distance shown in display 46 is calculated by twice integrating the acceleration signal received from the accelerometer 12, but it will be understood that this distance may be measured in many ways. In its preferred form, the computer 14 also calculates a live take-off distance for the current take-off based upon the signal from the accelerometer 12 and the input information and this live take-off distance is shown in a display 48. More particularly, to calculate the live take-off distance, the computer 14 takes five samples of actual acceleration for five actual velocities. Then, using the five samples and the information previously input by the pilot through panel 17, it solves an equation having five constants to determine the five constants, and using the five constants, it calculates a live take-off distance. Thus, it is appreciated that live take-off distance is based on input information and actual acceleration but is not based on historical data.

Finally, in display 50, a reference take-off distance is provided. This distance is calculated entirely from historical data obtained from previous take-offs and the input information. When the pilot depresses the run/clear key on the data input register 17, the computer calculates the reference take-off distance and places it in the display 50 for immediate reference by the pilot. The distance display panel 44 also includes a green light 52 that will be illuminated whenever the live take-off distance for the present take-off shown in display 48 is within 10 percent of the reference take-off distance shown in display 50. An amber lamp 54 is illuminated when the live take-off distance is more than 110 percent, but less than 120 percent, of the reference take-off distance. Finally, the red lamp 56 is illuminated when the live take-off distance exceeds the reference take-off distance by a factor of 120 percent.

The distance display panel 44 is partially inactive during the very early part of the ground roll until the airplane achieves a minimum velocity, typically 40 knots, in the case of a jet. During this partial inactivity, none of the lamps 52-56 are illuminated and X's ar shown in the display 48 for the live take-off distance. The remaining two displays 46 and 50 are active and show the roll distance and the reference take-off distance, respectively.

From the above description, it will be appreciated that the indicator 10 provides a pilot with accurate and early information concerning take-off performance. When the pilot taxies to the end of the runway, the display 50 will show him an anticipated reference take-off distance based upon historical data and input information. If this distance exceeds or is very near the length of the runway, the pilot will realize that he has a take-off problem. This type of situation might arise, for example, when a pilot is on unfamiliar and short runway on a hot day, is heavily loaded and has a slight tail wind.

In an opposite situation, if a pilot is on a very long runway and is very lightly loaded, he may chose a lower than normal power setting. Since the anticipated power setting has been provided to the computer 14 through the panel 16, the take-off performance indicator 10 will automatically compensate for this power setting adjustment. It will predict the reference take-off distance and place it in display 50 based upon the anticipated low power setting. Also, the meter 32 will indicate the acceleration ratio based upon the knowledge that a lower than normal power setting is being used. Thus, even though the thrust is greatly reduced and the acceleration is greatly reduced, the needle 33 will still indicate acceleration in the green area if the acceleration is near that which is predicted based upon historical data and input information including that particular power setting.

In any take-off, if the needle 33 points to the amber section 38 of the dial 32 or if the amber lamp 54 on the panel 44 is illuminated the pilot is alerted to a possible problem with the take-off He would then refer to the display 48 and if the predicted distance of take-off is still well below the runway length, he may chose to do nothing except carefully monitor the take-off In this manner, the pilot may discover that he has set the engines at the wrong power setting and such problem may be easily corrected by increasing the engine power setting.

If the needle 33 points to the red section 40 of the dial 34 and/or the red lamp 56 is illuminated on distance panel 44, the pilot would be warned of an acceleration problem while the airplane was still traveling at relatively slow speeds. In such case, the take-off could be easily aborted.

In the preferred form of the invention, the historical store key 24 in the data input register 17 is illuminated and starts flashing four minutes after the run/clear key 20 has been depressed. At this point, the pilot will decide whether to store the previous take-off data in the data base. If the take-off proceeded as expected, the pilot will probably store the information in the data base. However, if the take-off was unusual or followed an unexpected procedure, the pilot would simply turn the take-off monitor off. For example, if the pilot aborted a take-off or if the pilot used full power after originally inputting to the computer 14 that he would use 80 percent power, these take-offs would not be entered into the data base.

An important feature of the present invention is the historical data base indicating take-off performance and the manner in which the computer generates and uses the data base. As the airplane takes off, the computer 14 constantly samples and records the acceleration and the velocity of the airplane so computer will have a record of the aircraft's acceleration at any particular velocity during a take-off roll. However, merely recording this acceleration versus velocity data would not be very useful for predicting take-off performance when the operating conditions of the aircraft change radically. Therefore, the computer 14, in the preferred embodiment, develops a number of constants for each take-off that are indicative of the take-off performance and that are independent of the variable operating conditions of the aircraft including percentage of rated thrust or power, aircraft gross weight at take-off, headwind component, outside air temperature, local atmospheric pressure, coefficient of rolling resistance, and runway slope. In the preferred embodiment, five constants C1, C2, C3, C4, and C5 are developed from the equation for acceleration (a) below:

$$a = 1/W\{A(C1)(V_G + V_W) + [A(C3) - (C4)P/T + (C5)\mu P/T][V_G + V_2]^2 - \mu g\, W \cos\theta - g\, W \sin\theta\} \quad \text{(Equation 1)}$$

Inputs which the pilot would have to make include:
A—percent of rated thrust or power
W—aircraft gross weight at take-off
$V_W$—headwind component (maybe generated from runway heading and wind direction and velocity)
T—outside air temperature (OAT)
P—local atmospheric pressure
$\mu$—coefficient of rolling resistance
$\theta$—runway slope
and where:
g = acceleration due to gravity
a = aircraft acceleration
$V_G$ = aircraft ground velocity The above equation is solved for the constants C1–C5 by sampling the acceleration and velocity of the aircraft on take-off at least five times and using the five samples of acceleration and corresponding velocity to solve the equation for the constants.

The equation is a general description of take-off performance taking into consideration the numerous factors which influence take-off performance. Referring to the equation, it will be noted that C1 is multiplied by the percentage of rated power or thrust (A) and, thus, C1 may be thought of as a constant relating to static thrust. The term A, percentage of rated thrust, is a number that is directly proportional to the rated thrust developed by the engine on take-off. This term, A, may be provided by the pilot or it may be calculated by the computer. For example, the pilot may input the intended power setting, the temperature and the pressure and the computer 14 would be pre-programmed to calculate A, percentage of rated thrust.

C2 is also multiplied by the percentage of rated power and by the sum of ground velocity and headwind. Thus, C2 is a constant relating to a linear relationship between thrust and velocity. C3 is multiplied by the percentage of rated power and the square of the sum of ground velocity plus headwind and, thus, C3 is a constant related to the nonlinear relationship between thrust and velocity. C4 is multiplied by pressure divided by temperature which is then multiplied by the square of the sum of the ground velocity and the headwind component. C4 is a constant relating to air drag. Finally, C5 is multiplied by the coefficient of rolling resistance and may be considered as a constant relating to rolling drag.

The above equation is an equation designed to describe in a general manner the take-off performance of an aircraft in which the various environmental and outside conditions are provided as inputs, and constants are developed that will generally describe the take-off performance of the aircraft. Although this particular equation is preferred, it is understood that it is one of many equations that could adequately describe take-off performance for the purpose of developing and using constants that describe take-off performance independent of outside conditions. In the preferred embodiment, the acceleration and velocity data is stored in its raw form for each take-off and, for each take-off, the equation is solved for C1, C2, C3, C4 and C5 and these constants are also stored. In addition, an average of the constants for the last twenty take-offs is calculated and stored for use as the historical data. When the pilot inputs the aforementioned information through data input register 17 and depresses the run key, the computer 14 will use the historical data (the average constants) and the input information to calculate an acceleration and velocity data. Then, using the data, the computer will calculate and display a reference take-off distance on display 50. As the computer monitors the take-off, once it notes that the aircraft is traveling 40 knots, it will use the acceleration and velocity data that was previously calculated from the input information and historical data and it will compare the aircraft's actual acceleration to its reference acceleration. This ratio will be displayed on meter 32 as previously described.

Figure 6:
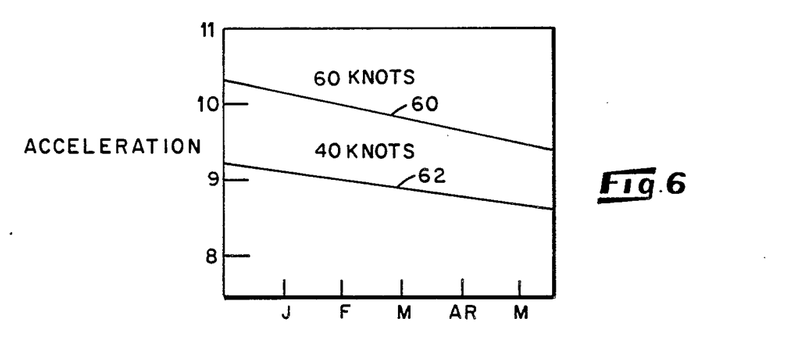
FIG. 6 is a graph of acceleration for particular velocities during the months of January through May.
Figure 7:
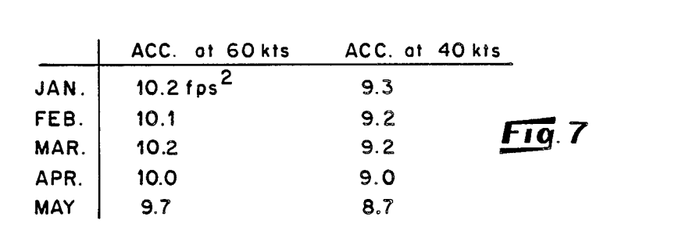
FIG. 7 is a table of acceleration for particular velocities during the months of January through May.

The ability to store the take-off performance data, particularly data relating to the constants for each take-off is a significant aspect of the present invention. This feature enables the user to observe trends in take-off performance. For example, in FIG. 6 there is shown a graph of reference acceleration for the same conditions over a period of five months. The top line 60 in FIG. 6 represents reference acceleration of the aircraft that has achieved 60 knots and a line 62 represents the reference acceleration of the aircraft once it achieves 40 knots. These two lines 60 and 62 graphically represent a dramatic deterioration in performance over a period of five months. This trend is also shown in FIG. 7 in tabular form. The reference acceleration data shown in FIGS. 6 and 7 is not a direct measurement of acceleration. Because of the widely changing conditions under which the aircraft operates, a graph of raw acceleration data would not be very informative. Thus, the data shown in FIGS. 6 and 7 are calculated reference accelerations that are calculated using the constants C1–C5 for the same set of operating conditions. In this manner, the trend of the aircraft acceleration is easily detected.

Figure 5:
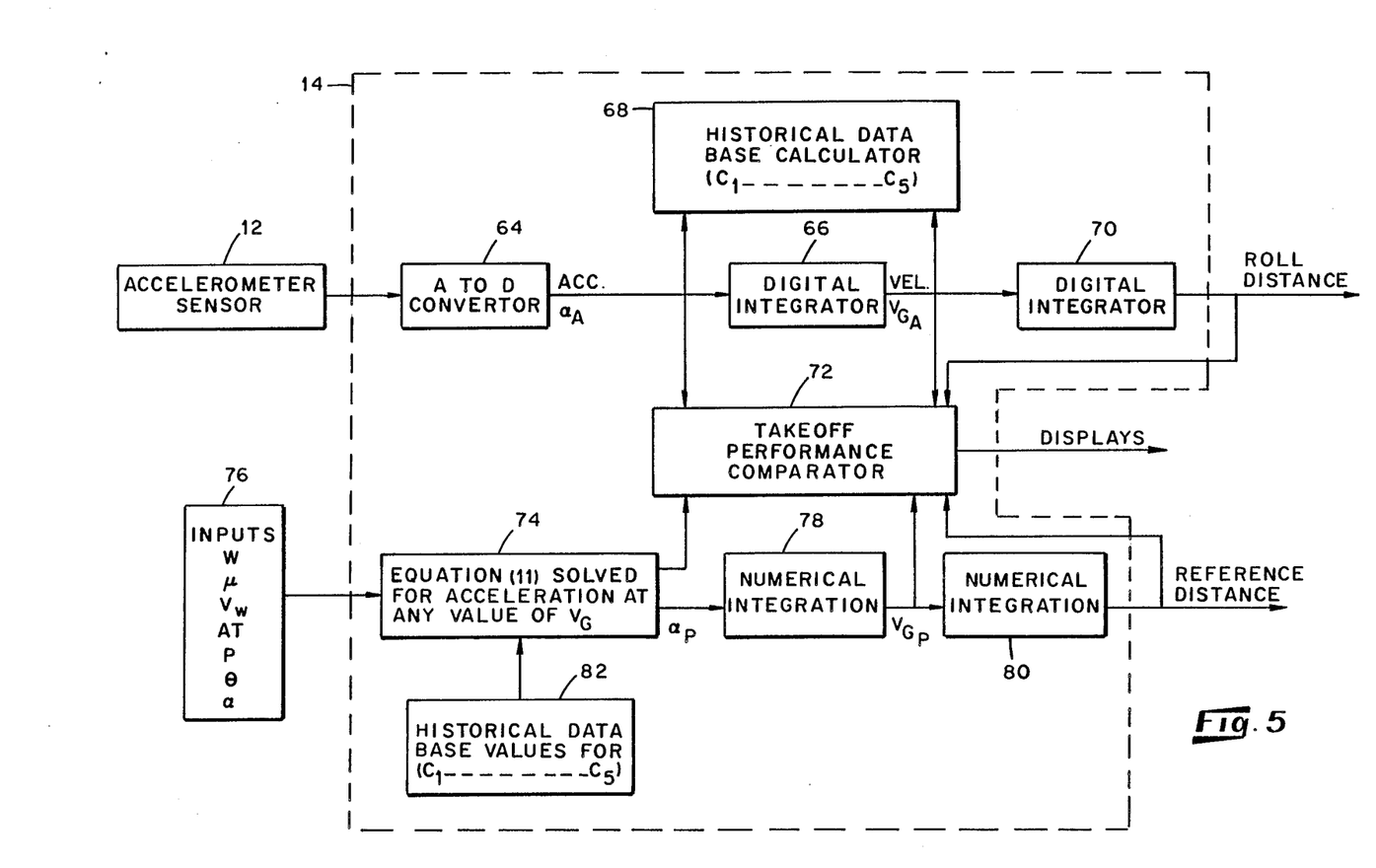
FIG. 5 is a more detailed block diagram of the indicator 10.

Referring now to FIG. 5, there is shown a flow and block diagram for the calculation and use of the constants C1–C5. The signal from the accelerometer 12 is applied to A/D converter 64 which produces a digital acceleration signal that is provided to a digital integrator 66 and historical data base calculator 68. The output of the digital integrator 66 constitutes the velocity of the aircraft and this information is provided to the calculator 68 and to a digital integrator 70. The output of integrator 70 is the actual distance traveled by the aircraft. The outputs of the A/D converter 64 and the integrators 66 and 70 are also applied to a take-off performance comparator 72 which controls the information displayed on meter 32 and display panel 44. The comparator 72 also receives data from the equation solver block 74 which uses the inputs from block 76 and the historical data base values for C1–C5 from block 82 in order to calculate a predicted acceleration for any value of the actual velocity. The output of block 74 is also applied to a numerical integrator 78 whose output would be the reference velocity and the output of the numerical integrator 78 is applied through the numerical integrator 80 to produce an output corresponding to the reference take-off distance based upon the historical data from block 82. The output of the integrator 80 is also applied as an input to the take-off performance comparator 72. In comparator 72, a look-up table may be established using the data from block 74 in which a reference acceleration is provided for each in a series reference velocity. As the airplane is taking off, the actual acceleration and velocity are provided to the comparator 72 from converter 64 and integrator 66, respectively, and the comparator looks up the predicted acceleration based upon the actual velocity. Then, the predicted acceleration for a particular velocity is compared to the actual acceleration for the same velocity and this number, as a ratio, is output from the comparator 72 and displayed on meter 32. Also, the reference take-off distance which is provided to the comparator 72 by numerical integrator 80 is output from the comparator 72 and displayed on the panel 74 at display 50. The comparator 72 also uses the actual acceleration and velocity to calculate live take-off distance which is displayed in display 48. To do this, equation 1 (previously described) is solved using five samples of actual acceleration and velocity to determine the five constants C1–C5. Then, using the five constants and equation 1, the roll distance required to achieve rotation velocity (or another selected velocity) is calculated. This distance is the live take-off distance that is shown in display 48 (FIG. 3). Finally, actual roll distance traveled is directly displayed through the comparator 72 in the display 46 of panel 44. After the take-off, the historical data base calculator 68 calculates new constants for the immediately previous take-off and these constants are provided to the historical data base 82 along with the raw data, assuming the pilot has chosen to use this take-off as part of the data base. Also, a new value for the average five constants for the previous twenty take-offs is recalculated and stored in the historical data base 82.

Although a particular embodiment has been described in the foregoing detailed description, it will be understood that the invention is capable of numerous rearrangements, modifications and substitutions of parts without departing from the spirit and scope of the invention as defined by the appended claims. In particular, it is noted that numerous types of predictions may be made and compared to actual conditions by computer 14. For example, one might chose to display actual velocity as a percentage of predicted velocity at the actual distance traveled or to display actual roll distance as a percentage of reference roll distances at a particular velocity. Although every possible variation is not described above, these variations are not intended to be excluded from the scope of the invention.

What is claimed is:

1. A take-off performance monitor for an aircraft comprising:
   means for inputting parameters affecting the take-off performance of the aircraft including at least environmental factors and engine power settings;
   storage means for storing said parameters;
   means for measuring the movement of the aircraft during a take-off roll to produce a movement signal;
   means responsive at least to said movement signal for determining at least the aircraft acceleration and a corresponding aircraft velocity and for producing aircraft acceleration and velocity data;
   said storage means being operable to store said aircraft acceleration and velocity data;
   calculating means responsive to the input parameters and the aircraft acceleration and velocity data for calculating at least one take-off constant based upon both the input parameters and the acceleration and velocity data, said take-off constant being indicative of aircraft take-off performance;
   said storage means including stored historical data corresponding to said at least one take-off constant for at least selected take-offs of the aircraft;
   analyzing means for analyzing take-off performance substantially in real-time during a take-off roll by using the historical data collected from previous take-offs and the current take-off performance to produce analyzed data; and
   output means for outputting the analyzed data to the pilot.

2. The monitor of claim 1 wherein said analyzing means further comprises:
   predicting means for producing a reference take-off performance based on the input parameters and the historical data in said storage means;
   means for monitoring the acceleration and velocity and determining actual take-off performance; and
   means for outputting data corresponding to the reference take-off performance and the actual take-off performance.

3. The monitor of claim 1 wherein said storage means further comprises means for calculating at least one average take-off constant based on at least one take-off constant determined for each of plurality of take-offs.

4. The monitor of claim 1 wherein said calculating means further comprises means for calculating a plurality of take-off constants for each take-off.

5. The monitor of claim 1 wherein said analyzing means further comprises predicting means for predicting a reference take-off distance based on the input parameters and the historical data and for predicting a live take-off distance during a take-off roll based on the input parameters and the movement signal; and
   means for outputting data corresponding to the reference take-off distance and the live take-off distance during the take-off roll.

6. The monitor of claim 1 wherein said analyzing means further comprises:
   predicting means for calculating a reference acceleration of the aircraft at each of a plurality of velocities based upon the historical data and the input parameters;
   means for determining actual acceleration and velocity of the aircraft during the take-off roll from the movement signal; and
   means for outputting data corresponding to the reference acceleration and the actual acceleration for the actual velocity during the take-off roll.

7. The monitor of claim 1 wherein said analyzing means comprises:
   predicting means for calculating a reference velocity of the aircraft for a plurality of distances in a take-off roll based upon the historical data and the input parameters;
   means for determining the actual velocity and actual roll distance of the aircraft during the take-off roll from the movement signal; and
   means for outputting the data corresponding to the reference velocity and the actual velocity during the take-off roll at the actual roll distance.

8. The apparatus of claim 1 wherein said storage means stores data corresponding to a plurality of take-off constants calculated from a plurality of take-offs whereby changes in the aircraft take-off performance over time can be detected by comparing changes over a period of time in the data corresponding to the take-off constants.

9. A take-off performance monitor for an aircraft in which the aircraft has air drag, rolling drag and a thrust setting apparatus for setting static and dynamic thrust of the aircraft, said monitor comprising:
   means for inputting parameters affecting take-off performance of the aircraft including parameters indicative of percentage of rated thrust for a particular take-off, aircraft weight, headwind velocity, air temperature, runway slope and atmospheric pressure;
   storage means for storing said parameters;
   means for measuring the movement of the aircraft during a take-off roll to produce a movement signal;
   means responsive at least to said movement signal for determining at least the actual acceleration and velocity of the aircraft during the take-off roll and for producing at least aircraft actual acceleration and velocity data;
   said storage means being operable to store said aircraft actual acceleration and velocity data;
   calculating means responsive to the input parameters and the aircraft actual acceleration and velocity data to solve an aircraft performance equation to determine X number of equation constants, said calculating means being operable to solve said equation based on X number of actual acceleration values and X number of corresponding actual velocity values;
   said storage means including stored historical data corresponding the X number of equation constants for a plurality of previous take-offs;
   means for predicting a reference take-off performance for a particular take-off based at least upon the input parameters and the historical data to produce reference data; and
   means for outputting the reference data to the pilot.

10. The apparatus of claim 9 wherein said calculating means further comprises means for solving the equation to determine at least one constant relating to static thrust of the aircraft.

11. The monitor of claim 9 wherein said calculating means further comprises means for solving the equation to determine at least one constant relating to dynamic thrust of the aircraft.

12. The monitor of claim 9 wherein said calculating means further comprises means for solving the equation to determine at least one constant relating to air drag of the aircraft.

13. The monitor of claim 9 wherein said calculating means further comprises means for solving the equation to determine at least one constant relating to rolling drag of the aircraft.

14. The monitor of claim 9 wherein said calculating means further comprises means for solving the equation to determine at least three constants relating to thrust, the first such constant relating to the static thrust of the aircraft, the second such constant relating to a linear relationship between thrust and velocity, and the third constant relating to a non-linear relationship between thrust and velocity.

15. The monitor of claim 9 wherein said calculating means further comprises means for solving the following equation:

$$a = 1/W\{A(C1)(V_G + V_W) + [A(C3) - (C4)P/T + (C5)\mu P/T][V_G + V_2]^2 - \mu g W \cos\theta - g W \sin\theta\} \quad \text{(Equation 1)}$$

Inputs which the pilot would have to make include:
A—percent of rated thrust or power
W—aircraft gross weight at take-off
$V_W$—headwind component (maybe generated from runway heading and wind direction and velocity)
T—outside air temperature (OAT)
P—atmospheric pressure
$\mu$—coefficient of rolling resistance
$\theta$—runway slope
and where:
   g = acceleration due to gravity
   a = aircraft acceleration
   $V_G$ = aircraft ground velocity
to determine five constants, C1, C2, C3, C4, and C5 wherein C1 relates to static thrust; C2 relates to linearly changing thrust with velocity, C3 relates to non-linearly changing thrust with velocity, C4 relates to air drag and C5 relates to rolling drag.

* * * * *

UNITED STATES PATENT AND TRADEMARK OFFICE
CERTIFICATE OF CORRECTION

PATENT NO. : 4,980,833
DATED : 12/25/90
INVENTOR(S) : Milligan et al.

It is certified that error appears in the above-identified patent and that said Letters Patent is hereby corrected as shown below:

IN THE ABSTRACT

Line 9, "pilor" should be --pilot--;

Line 10, "to" should be --of--;

Column 3, line 2 "t" should be --to--;

Column 6, line 17, "ar" should be --are--;

Column 7, line 18, "so computer" should be --so that the computer--;

Column 7, line 35 "{A(C1)($V_G + V_w$)" should be --{A(C1) + A(C2)($V_G + V_w$)--;

Column 7, line 36, "$[V_G + V_2]^2$" should be --$[V_G + V_w]^2$--;

UNITED STATES PATENT AND TRADEMARK OFFICE
CERTIFICATE OF CORRECTION

PATENT NO. : 4,980,833
DATED : 12/25/90
INVENTOR(S) : Milligan et al.

It is certified that error appears in the above-identified patent and that said Letters Patent is hereby corrected as shown below:

Column 12, line 39, "{A(C1)($V_G + V_W$)" should be --{A(C1) + A(C2)($V_G + V_W$)--;

Column 12, line 40, "[$V_G + V_2$]$^2$" should be --[$V_G + V_W$]$^2$--;

Column 12, line 48, "P - atmospheric pressure" should be --P - local atmospheric pressure--.

Signed and Sealed this

Twenty-first Day of July, 1992

Attest:

DOUGLAS B. COMER

*Attesting Officer*  *Acting Commissioner of Patents and Trademarks*